(12) United States Patent
Alattar

(10) Patent No.: US 6,608,919 B1
(45) Date of Patent: Aug. 19, 2003

(54) METHOD AND APPARATUS FOR ENCODING PAPER WITH INFORMATION

(75) Inventor: Adnan M. Alattar, Tigard, OR (US)

(73) Assignee: Digimarc Corporation, Tualatin, OR (US)

( * ) Notice: Subject to any disclaimer, the term of this patent is extended or adjusted under 35 U.S.C. 154(b) by 0 days.

(21) Appl. No.: 09/515,545

(22) Filed: Feb. 29, 2000

Related U.S. Application Data

(63) Continuation-in-part of application No. 09/437,357, filed on Nov. 10, 1999, now abandoned.

(51) Int. Cl.⁷ .................................................. G06K 9/00
(52) U.S. Cl. ........................ 382/135; 283/72; 382/276
(58) Field of Search ................................. 382/100, 112, 382/135, 137, 138, 181, 191, 108, 219, 232, 280, 278, 276, 312; 356/456; 358/16, 456; 380/54, 23; 713/150; 162/123, 125, 130–140; 101/321, 3.1; 283/67, 72

(56) References Cited

U.S. PATENT DOCUMENTS

| | | | |
|---|---|---|---|
| 3,569,619 A | 3/1971 | Simjian | 235/380 |
| 3,984,624 A | 10/1976 | Waggener | 348/473 |
| 4,230,990 A | 10/1980 | Lert, Jr. et al. | 725/22 |
| 4,234,214 A | * 11/1980 | Lee | 283/57 |
| 4,238,849 A | 12/1980 | Gassmann | 370/204 |
| 4,296,326 A | 10/1981 | Haslop et al. | 283/6 A |
| 4,297,729 A | 10/1981 | Steynor et al. | 360/40 |
| 4,313,197 A | 1/1982 | Maxemchuk | 370/210 |
| 4,367,488 A | 1/1983 | Laventer et al. | 348/467 |
| 4,379,947 A | 4/1983 | Warner | 370/204 |

(List continued on next page.)

FOREIGN PATENT DOCUMENTS

| | | | |
|---|---|---|---|
| CA | 2235002 | | 12/1998 |
| DE | 29433436 | * | 5/1981 |
| EP | 493 091 | | 7/1992 |
| EP | 0789480 | | 8/1997 |
| EP | 872995 | | 10/1998 |

(List continued on next page.)

OTHER PUBLICATIONS

Szepanski, W., "A Signal Theoretic Method For Creating Forgery–Proof Documents for Automatic Verification", 1979 Carnahan Conference on Crime Countermeasures, May 16–18, 1979, pp. 101–109.*

O'Ruanaidh et al., "Rotation, Scale and translation Invariant Digital Image Watermarking," Int. Conf. on Image Proc., Oct. 1997 *IEEE, pp. 536–539.

U.S. patent application Ser. No. 09/127,502, Rhoades, filed Jul. 7, 1998.

U.S. patent application Ser. No. 60/000,442, Hudetz, filed Jun. 20, 1995.

U.S. patent application Ser. No. 60/082,228, Rhoads, filed Apr. 16, 1998.

(List continued on next page.)

*Primary Examiner*—Jayanti K. Patel
(74) *Attorney, Agent, or Firm*—William Y. Conwell; Digimarc Corporation

(57) ABSTRACT

Paper is textured with a pattern that yields a known signature signal when transformed to the frequency domain. This signature can be used for various purposes, including determining the angular orientation of the paper when scanned, conveying a plural-bit digital watermark, and for simple document recognition purposes (e.g., photocopiers that refuse to reproduce banknotes). The texturing can be effected during the paper-making process, e.g., by shaping the surface of a de-watering element accordingly.

12 Claims, 1 Drawing Sheet

U.S. PATENT DOCUMENTS

| | | | |
|---|---|---|---|
| 4,380,027 A | 4/1983 | Leventer et al. | 348/467 |
| 4,395,600 A | 7/1983 | Lundy et al. | 381/73.1 |
| 4,425,642 A | 1/1984 | Moses et al. | 370/477 |
| 4,528,588 A | 7/1985 | Löfberg | 340/5.1 |
| 4,547,804 A | 10/1985 | Greenberg | 348/460 |
| 4,618,257 A | 10/1986 | Bayne et al. | 356/71 |
| 4,672,605 A | 6/1987 | Hustig et al. | 370/201 |
| 4,675,746 A | 6/1987 | Tetrick et al. | 358/296 |
| 4,682,540 A * | 7/1987 | Eastman et al. | 101/32 |
| 4,739,377 A | 4/1988 | Allen | 355/133 |
| 4,750,173 A | 6/1988 | Blüthgen | 370/528 |
| 4,807,031 A | 2/1989 | Broughton et al. | 348/460 |
| 4,855,827 A | 8/1989 | Best | 348/485 |
| 4,879,747 A | 11/1989 | Leighton et al. | 713/186 |
| 4,888,798 A | 12/1989 | Earnest | 705/54 |
| 4,908,836 A | 3/1990 | Rushforth et al. | 375/152 |
| 4,908,873 A | 3/1990 | Philibert et al. | 382/100 |
| 4,910,688 A | 3/1990 | Amini | 702/33 |
| 4,944,036 A | 7/1990 | Hyatt | 367/43 |
| 4,947,028 A | 8/1990 | Gorog | 235/380 |
| 4,968,386 A | 11/1990 | Nguyen | 162/262 |
| 4,969,041 A | 11/1990 | O'Grady et al. | 348/473 |
| 4,971,646 A * | 11/1990 | Schell et al. | 156/244 |
| 4,972,476 A | 11/1990 | Nathans | 713/186 |
| 4,977,594 A | 12/1990 | Shear | 705/53 |
| 5,023,907 A | 6/1991 | Johnson | 710/200 |
| 5,027,401 A | 6/1991 | Soltesz | 380/54 |
| 5,040,059 A | 8/1991 | Leberl | 348/135 |
| 5,053,956 A | 10/1991 | Donald | 713/601 |
| 5,062,666 A * | 11/1991 | Mowry et al. | 283/67 |
| 5,094,718 A | 3/1992 | Friend | 162/198 |
| 5,095,196 A | 3/1992 | Miyata | 235/382 |
| 5,103,459 A | 4/1992 | Gilhousen et al. | 370/206 |
| 5,113,445 A | 5/1992 | Wang | 380/51 |
| 5,146,457 A | 9/1992 | Veldhuis et al. | 370/523 |
| 5,181,786 A | 1/1993 | Hujink | 400/61 |
| 5,200,822 A | 4/1993 | Bronfin et al. | 725/22 |
| 5,213,337 A | 5/1993 | Sherman | 463/40 |
| 5,216,724 A | 6/1993 | Suzuki et al. | 382/135 |
| 5,243,423 A | 9/1993 | DeJean et al. | 348/473 |
| 5,259,025 A | 11/1993 | Monroe | 705/75 |
| 5,280,537 A | 1/1994 | Sugiyama et al. | 370/529 |
| 5,288,976 A | 2/1994 | Citron | 235/375 |
| 5,291,243 A * | 3/1994 | Heckman et al. | 355/201 |
| 5,295,203 A | 3/1994 | Krause et al. | 382/248 |
| 5,315,098 A | 5/1994 | Tow | 235/494 |
| 5,321,470 A | 6/1994 | Hasuo et al. | 399/366 |
| 5,374,976 A | 12/1994 | Spannenburg | 399/366 |
| 5,379,345 A | 1/1995 | Greenberg | 455/2.01 |
| 5,416,307 A | 5/1995 | Danek et al. | 235/449 |
| 5,428,607 A | 6/1995 | Hiller et al. | 370/352 |
| 5,428,731 A | 6/1995 | Powers | 707/501.1 |
| 5,449,200 A * | 9/1995 | Andric et al. | 283/67 |
| 5,463,209 A | 10/1995 | Figh | 235/383 |
| 5,469,222 A | 11/1995 | Sprague | 348/580 |
| 5,469,506 A | 11/1995 | Berson et al. | 713/186 |
| 5,493,677 A | 2/1996 | Balogh | 707/104.1 |
| 5,495,581 A * | 2/1996 | Tsai | 395/154 |
| 5,496,071 A | 3/1996 | Walsh | 283/70 |
| 5,502,576 A | 3/1996 | Ramsay et al. | 358/444 |
| 5,521,722 A * | 5/1996 | Colvill et al. | 358/500 |
| 5,524,933 A * | 6/1996 | Kunt et al. | 283/67 |
| 5,530,759 A | 6/1996 | Braudaway et al. | 380/54 |
| 5,530,852 A | 6/1996 | Meske, Jr. et al. | 709/206 |
| 5,568,550 A | 10/1996 | Ur | 382/306 |
| 5,583,614 A * | 12/1996 | Hasuo | 355/201 |
| 5,583,639 A | 12/1996 | Hasuo | 399/4 |
| 5,583,950 A * | 12/1996 | Prokoski | 382/212 |
| 5,594,226 A | 1/1997 | Steger | 235/379 |
| 5,598,526 A | 1/1997 | Daniel et al. | 345/540 |
| 5,613,004 A | 3/1997 | Cooperman et al. | 380/28 |
| 5,617,119 A | 4/1997 | Briggs et al. | 707/100 |
| 5,636,292 A | 6/1997 | Rhoads | 382/282 |
| 5,638,443 A | 6/1997 | Stefik | 705/54 |
| 5,640,193 A | 6/1997 | Wellner | 725/100 |
| 5,646,999 A | 7/1997 | Saito | 705/54 |
| 5,652,626 A | 7/1997 | Kawakami et al. | 348/463 |
| 5,659,164 A | 8/1997 | Schmid | 235/375 |
| 5,663,766 A | 9/1997 | Sizer, II | 348/473 |
| 5,664,018 A | 9/1997 | Leighton | 380/54 |
| 5,665,951 A | 9/1997 | Newman et al. | 235/375 |
| 5,668,636 A | 9/1997 | Beach et al. | 358/296 |
| 5,671,282 A | 9/1997 | Wolff et al. | 713/179 |
| 5,673,316 A | 9/1997 | Auerbach et al. | 705/51 |
| 5,687,236 A | 11/1997 | Moskowitz et al. | 380/28 |
| 5,710,636 A | 1/1998 | Curry | 358/3.28 |
| 5,719,939 A | 2/1998 | Tel | 713/179 |
| 5,721,788 A | 2/1998 | Powell et al. | 382/100 |
| 5,727,092 A | 3/1998 | Sandford, II et al. | 382/251 |
| 5,735,547 A | 4/1998 | Morelle et al. | 283/67 |
| 5,740,244 A | 4/1998 | Indeck et al. | 713/176 |
| 5,740,276 A * | 4/1998 | Tomko et al. | 382/210 |
| 5,742,845 A | 4/1998 | Wagner | 395/821 |
| 5,745,604 A | 4/1998 | Rhoads | 382/232 |
| 5,761,686 A | 6/1998 | Bloomberg | 707/529 |
| 5,768,426 A | 6/1998 | Rhoads | 382/232 |
| 5,778,102 A | 7/1998 | Sandford, II et al. | 382/251 |
| 5,790,693 A | 8/1998 | Graves et al. | 382/135 |
| 5,790,697 A | 8/1998 | Munro et al. | 382/135 |
| 5,804,803 A | 9/1998 | Cragun et al. | 235/325 |
| 5,809,160 A | 9/1998 | Powell et al. | 382/100 |
| 5,809,317 A | 9/1998 | Kogan et al. | 707/501.1 |
| 5,815,198 A | 9/1998 | Vachtsevanos et al. | 348/88 |
| 5,817,205 A * | 10/1998 | Kaule | 156/233 |
| 5,818,441 A | 10/1998 | Throckmorton et al. | 345/717 |
| 5,819,289 A | 10/1998 | Sanford, II et al. | 707/104.1 |
| 5,822,436 A * | 10/1998 | Rhoads | 380/54 |
| 5,825,871 A | 10/1998 | Mark | 379/352.03 |
| 5,825,892 A | 10/1998 | Braudaway et al. | 380/51 |
| 5,835,639 A | 11/1998 | Honsinger et al. | 382/278 |
| 5,838,458 A | 11/1998 | Tsai | 358/402 |
| 5,841,978 A | 11/1998 | Rhoads | 709/217 |
| 5,848,144 A | 12/1998 | Ahrens | 379/219 |
| 5,848,413 A | 12/1998 | Wolff | 707/10 |
| 5,850,481 A | 12/1998 | Rhoads | 382/232 |
| 5,852,673 A | 12/1998 | Young | 382/164 |
| 5,857,038 A | 1/1999 | Owada et al. | 382/284 |
| 5,862,218 A | 1/1999 | Steinberg | 713/176 |
| 5,862,260 A | 1/1999 | Rhoads | 382/232 |
| 5,869,819 A | 2/1999 | Knowles et al. | 235/375 |
| 5,871,615 A | 2/1999 | Harris | 162/140 |
| 5,872,589 A | 2/1999 | Morales | 725/24 |
| 5,875,249 A | 2/1999 | Mintzer et al. | 380/54 |
| 5,893,101 A | 4/1999 | Balogh et al. | 707/100 |
| 5,898,779 A | 4/1999 | Squilla et al. | 713/176 |
| 5,900,608 A | 5/1999 | Iida | 235/381 |
| 5,902,353 A | 5/1999 | Reber et al. | 709/219 |
| 5,903,729 A | 5/1999 | Reber et al. | 709/219 |
| 5,905,248 A | 5/1999 | Russell et al. | 235/462.15 |
| 5,905,251 A | 5/1999 | Knowles | 235/472.01 |
| 5,905,810 A | 5/1999 | Jones et al. | 382/135 |
| 5,912,972 A * | 6/1999 | Barton | 380/23 |
| 5,913,210 A | 6/1999 | Call | 707/4 |
| 5,915,027 A | 6/1999 | Cox et al. | 380/54 |
| 5,930,767 A | 7/1999 | Reber et al. | 705/26 |
| 5,932,863 A | 8/1999 | Rathus et al. | 235/462.15 |
| 5,933,798 A | 8/1999 | Linnartz | 702/91 |
| 5,933,829 A | 8/1999 | Durst et al. | 707/10 |
| 5,938,726 A | 8/1999 | Reber et al. | 709/217 |
| 5,938,727 A | 8/1999 | Ikeda | 709/218 |
| 5,939,695 A | 8/1999 | Nelson | 235/383 |

| | | | | |
|---|---|---|---|---|
| 5,940,595 A | | 8/1999 | Reber et al. | 709/227 |
| 5,949,055 A | | 9/1999 | Fleet et al. | 235/469 |
| 5,950,173 A | | 9/1999 | Perkowski | 705/26 |
| 5,963,916 A | | 10/1999 | Kaplan | 705/26 |
| 5,971,277 A | | 10/1999 | Cragun et al. | 235/462.01 |
| 5,974,141 A | | 10/1999 | Saito | 705/52 |
| 5,974,548 A | | 10/1999 | Adams | 713/200 |
| 5,978,773 A | | 11/1999 | Hudetz et al. | 705/23 |
| 5,979,757 A | | 11/1999 | Tracy et al. | 235/383 |
| 5,983,218 A | | 11/1999 | Syeda-Mahmoo | 707/3 |
| 5,991,426 A | | 11/1999 | Cox et al. | 382/100 |
| 6,005,501 A | | 12/1999 | Wolosewicz | 341/52 |
| 6,035,177 A | | 3/2000 | Moses et al. | 725/22 |
| 6,052,486 A | | 4/2000 | Knowlton et al. | 382/232 |
| 6,064,764 A | | 5/2000 | Bhaskaran et al. | 382/183 |
| 6,122,403 A | | 9/2000 | Rhoads | 382/233 |
| 6,324,574 B1 | | 9/2000 | Rhoads | 709/218 |
| 6,166,750 A | * | 12/2000 | Negishi | 347/131 |
| 6,200,419 B1 | * | 3/2001 | Phan | 162/130 |
| 6,266,430 B1 | | 7/2001 | Rhoads et al. | 382/100 |
| 6,282,300 B1 | | 8/2001 | Bloom et al. | 382/100 |
| 6,311,214 B1 | | 10/2001 | Rhoads | 709/217 |
| 6,321,648 B1 | | 11/2001 | Berson et al. | 101/32 |
| 6,334,678 B1 | * | 1/2002 | Daigneault et al. | 347/107 |
| 6,343,138 B1 | * | 1/2002 | Rhoads | 382/100 |
| 6,345,104 B1 | * | 2/2002 | Rhoads | 382/100 |
| 6,385,330 B1 | * | 5/2002 | Powell et al. | 382/100 |
| 2001/0026377 A1 | * | 10/2001 | Ikegami | |
| 2001/0042052 A1 | * | 11/2001 | Leon | |
| 2001/0055258 A1 | * | 12/2001 | Carson et al. | |
| 2002/0009208 A1 | | 1/2002 | Alattar et al. | 382/100 |

FOREIGN PATENT DOCUMENTS

| | | | |
|---|---|---|---|
| EP | 0642060 B1 | 4/1999 | |
| WO | WO94/27228 | 11/1994 | |
| WO | WO95/04665 | 2/1995 | |
| WO | WO95/10813 | 4/1995 | |
| WO | WO97/43736 | 11/1997 | |
| WO | WO98/14887 | 4/1998 | |
| WO | WO98/20642 | 5/1998 | |
| WO | WO98/24050 | 6/1998 | |
| WO | WO98/40823 | 9/1998 | |
| WO | WO98/49813 | 11/1998 | |
| WO | WO99/34277 | 7/1999 | |
| WO | WO99/36876 | 7/1999 | 382/100 |
| WO | WO00/44131 | 7/2000 | |
| WO | WO 01/80169 | 10/2001 | 382/100 |

OTHER PUBLICATIONS

U.S. patent application Ser. No. 60/141,763, Davis, filed Jun. 30, 1999.

U.S. patent application Ser. No. 60/158,015, Davis et al., filed Oct. 6, 1999.

U.S. patent application Ser. No. 60/314,648, Rodriguez et al., filed May 19, 1999.

U.S. patent application Ser. No. 09/342,688, Rodriguez, filed Jun. 1999.

U.S. patent application Ser. No. 09/342,971, Rodriguez et al., filed Jun. 29, 1999.

U.S. patent application Ser. No. 09/679,261, Davis et al., filed Oct. 4, 2000.

U.S. patent application Ser. No. 09/562,517, Davis et al., filed May 1, 2000.

U.S. patent application Ser. No. 09/547,664, Rhoads et al., filed Apr. 12, 2000

U.S. patent application Ser. No. 09/571,442, Rhoads et al., filed May 15, 2000.

U.S. patent application Ser. No. 09/858,189, Rhoads et al., filed May 14, 2001.

U.S. patent application Ser. No. 09/631,409, Brundage et al., filed Aug. 3, 2000.

U.S. patent application Ser. No. 09/452,021, Davis et al., filed Nov. 30, 1999.

U.S. patent application Ser. No. 09/629,401, Seder et al., filed Aug. 1, 2000.

U.S. patent application Ser. No. 09/473,396, Evans et al., filed Dec. 28, 1999.

U.S. patent application Ser. No. 09/563,664, Levy et al., filed May 2, 2000.

U.S. patent application Ser. No. 09/670,115, Rhoads et al., filed Sep. 26, 2000.

Brassil et al., Electronic Marking and Identification Techniques to Discourage Document Copying, Proceedings of INFOCOM '94 Conference on Computer, IEEE Commun. Soc Conference, Jun. 12–16, 1994, 1278–1287.

Bruckstein, A.M.; Richardson, T.J., A holographic transform domain image watermarking method, Circuits, Systems, and Signal Processing vol. 17, No.3 p. 361–89, 1998. This paper includes an appendix containing an internal memo of Bell Labs, which according to the authors of the paper, was dated Sep. 1994.

"High Water FBI Limited Presentation Image Copyright Protection Software," FBI Ltd brochure, Jul., 1995, 17 pages.

Koch et al., "Copyright Protection for Multimedia Data," Fraunhofer Institute for Computer Graphics, Dec. 16, 1994, 15 pages.

Koch et al., "Towards Robust and Hidden Image Copyright Labeling," Proc. of 1995 IEEE Workshop on Nonlinear Signal and Image Processing, Jun. 20–22, 1995, 4 pages Kurak et al., "A Cautionary Note On Image Downgrading," 1992 IEEE, pp. 153–159.

Mintzer et al., "Safeguarding Digital library Contents and Users Digital Watermarking," D–Lib Magazine, Dec. 1997: ISSN 1082–9873.

Rindfrey, "Towards an Equitable System for Access Control and Copyright Protection in Broadcast Image Services: The Equicrypt Approach," Intellectual Property Rights and New Technologies, Proc. of the Conference, R. Oldenbourg Verlag Wien Munchen 1995, 12 pages.

Schreiber et al., "A Compatible High–Definition Television System Using the Noise–Margin Method of Hiding Enhancement Information," SMPTE Journal, Dec. 1989, pp. 873–879.

SDMI Example Use Scenarios (Non–Exhaustive), Version 1.2, Jun. 16, 1999.

Szepanski, "A Signal Theoretic Method for Creating Forgery–Proof Documents for Automatic Verification," Proceedings 1979 Carnahan Conference on Crime Countermeasures, May 16, 1979, pp. 101–109

Szepanski, "Additive Binary Data Transmission for Video Signals," Papers Presented at Conf. Of Comm. Engineering Soc. Sep. 30–Oct. 3, 1980, Technical Reports vol. 74, pp. 342–352.

Tanaka et al., "A Visual Retrieval System with Private Information for Image Database," Proceeding International Conference on DSP Applications and Technology, Oct. 1991, pp. 415–421.

Tanaka et al., "New Integrated Coding Schemes for Computer–Aided Facsimile," Proc. IEEE Int'l Conf. on Sys. Integration, Apr. 1990, pp. 275–281.

Tirkel et al, "Electronic Water Mark," DICTA–93, Macquarie University, Sydney, Australia, Dec., 1993, pp. 666–673.

Weber et al., "Correlative Image Registration," Seminars in Nuclear Medicine, vol. XXIV, No. 4, Oct., 1994, pp. 311–323.

Szepanski, "A Signal Theoretic Method for Creating Forgery–Proof Documents for Automatic Verification," Proceedings 1979 Carnahan Conference on Crime Countermeasures, May 16, 1979, pp. 101–109.

Dautzenberg, "Watermarking Images," Department of Microelectronics and Electrical Engineering, Trinity College Dublin, 47 pages, Oct. 1994.

Szepanski, "Additive Binary Data Transmission for Video Signals," Conference of the Communications Engineering Society, 1980, NTG Technical Reports, vol. 74, pp. 343–351. (German text and English translation enclosed).

U.S. patent application Ser. No. 60/071,983, Levy, filed Jan. 20, 1998.

U.S. patent application Ser. No. 09/404,291, Levy, filed Sep. 23, 1999.

U.S. patent application Ser. No. 60/114,725, Levy, filed Dec. 31, 1998.

U.S. patent application Ser. No. 09/234,780, Rhoads/Gustafson, filed Jan. 20, 1999.

U.S. patent application Ser. No. 60/116,641, Cookson, filed Jan. 21, 1999.

U.S. patent application Ser. No. 09/478,713, Cookson, filed Jan. 6, 2000.

Cookson, Chris, General Principles of Music Uses on Portable Devices, presented to SDMI, Mar. 5, 1999.

Winograd, J.M., "Audio Watermarking Architecture for Secure Digital Music Distribution," a Proposal to the SDMI Portable Devices Working Group, by Aris Technologies, Inc., Mar. 26,1999.

Mintzer, et al., "Safeguarding Digital Library Contents and Users: Digital Watermarking," D–Lib Magazine, Dec. 1997, 12 pages.

U.S. patent application Ser. No. 09/765,102, Shaw, filed Jan. 17, 2001.

U.S. patent application Ser. No. 09/761,349, Rhoads, filed Jan. 16, 2001.

U.S. patent application Ser. No. 09/761,280, Rhoads, filed Jan. 16, 2001.

U.S. patent application Ser. No. 09/645,779, Tian et al., filed Aug. 24, 2000.

U.S. patent application Ser. No. 09/689,226, Brunk, filed Oct. 11, 2000.

U.S. patent application Ser. No. 09/689,250, Ahmed, filed Oct. 11, 2000.

U.S. patent application Ser. No. 09/689,293, Tian et al., filed Oct. 11, 2000.

U.S. patent application Ser. No. 09/625,577, Carr et al., filed Jul. 25, 2000.

U.S. patent application Ser. No. 09/574,726, Rhoads et al., filed May 18, 2000.

U.S. patent application Ser. No. 09/562,524, Carr et al., filed May 1, 2000.

U.S. patent application Ser. No. 09/498,223, Rhoads et al., filed Feb. 3, 2000.

U.S. patent application Ser. No. 09/465,418, Rhoads et al., filed Dec. 16, 1999.

U.S. patent application Ser. No. 09/431,990, Rhoads, filed Nov. 3, 1999.

U.S. patent application Ser. No. 09/428,359, Davis et al., filed Oct. 28, 2000.

U.S. patent application Ser. No. 09/342,972, Rhoads, filed Jun. 29, 1999.

U.S. patent application Ser. No. 09/293,602, Rhoads, filed Apr. 15, 1999.

U.S. patent application Ser. No. 09/293,601, Rhoads, filed Apr. 15, 1999.

U.S. patent application Ser. No. 09/287,940, Rhoads, filed Apr. 7, 1999.

U.S. patent application Ser. No. 09/185,380, Davis et al., filed Nov. 3, 1998.

U.S. patent application Ser. No. 09/074,034, Rhoads, filed May 6, 1998.

U.S. patent application Ser. No. 09/127,502, Rhoads, filed Jul. 31, 1998.

U.S. patent application Ser. No. 60/082,228, Rhoads, filed Apr. 16, 1998.

U.S. patent application Ser. No. 60/198,138, Alattar, filed Apr. 17, 2000.

*Audio Watermarking Architectures for Secure Digital Music Distribution, A Proposal to the SDMI Portable Devices Working Group* by ARIS Technologies, Inc, Mar. 26, 1999, pp. 1–11.

*Audio Watermarking Architectures for Persistent Protection, Presentation to SDMI PDWG*, Mar. 29, 1999, J. Winograd, Aris Technologies, pp. 1–16.

*Audio Watermarking System to Screen Digital Audio Content for LCM Acceptance, A Proposal Submitted in Response to PDWG9905054–Transition CfP* by ARIS Technologies, Inc., May 23, 1999, Document Version 1.0, 15 pages.

Boland et al., "Watermarking Digital Images for Copyright Protection", *Fifth Int'l Conference on Image Processing and it's Application*, Jul. 1995, pp. 326–330.

Levy, "AIPL's Proposal for SDMI: An Underlying Security System" (slide presentation), Mar. 29, 1999, 23 slides..

*Microsoft Response to CfP for Technology Solutions to Screen Digital Audio Content for LCM Acceptance*, SDMI, PDWG Tokyo, May 23, 1999, 9 pages.

*Response to CfP for Technology Solutions to Screen Digital Audio Content for LCM Acceptance*, NTT Waveless Radio Consotium, May 23, 1999, 9 pages.

Sandford II et al., "The Data Embedding Method", *Proceedings of the SPIE* vol. 2615, pp. 226–259, 1996.

Thomas Keith, *Screening Technology for Content from Compact Discs*, May 24, 1999, 11 pages.

Tirkel et al., "Electronic Water Mark," *Dicta—93*, Macquarie University, Sydney, Australia, Dec. 1993, pp. 666–672.

Vidal et al., "Non–Noticeable Information Embedding in Color Images: Marking and Detection", IEEE 1999, pp. 293–297.

Tirkel et al., "Electronic Water Mark," *Dicta–93*, Marquarie University, Sydney, Australia, Dec. 1993, pp. 666–672.

Frequently Asked Questions About Digimarc Signature Technology, http://www.digimarc.com, Aug. 1995, 9 pages.*

U.S. patent application Ser. No. 09/437,357, Alattar, filed Nov. 10, 1999.*

U.S. patent application Ser. No. 09/343,104, Rodriguez et al, filed Jun. 29, 1999.*

U.S. patent application Ser. No. 09/567,405, Rhoads et al., filed May 8, 2000.*

U.S. patent application Ser. No. 09/619,264, Kumar, filed Jul. 19, 2000.*

U.S. patent application Ser. No. 09/629,401, Seder et al., filed Aug. 1, 2000.*

U.S. patent application Ser. No. 09/452,021, Rhoads et al., filed Nov. 30, 1999.*

U.S. patent application Ser. No. 09/292,569, Rhoads et al., filed Apr. 15, 1999.*

* cited by examiner

METHOD AND APPARATUS FOR ENCODING PAPER WITH INFORMATION

RELATED APPLICATION DATA

This application is a continuation-in-part of application Ser. No. 09/437,357, filed Nov. 10, 1999 now abandoned.

FIELD OF THE INVENTION

The present invention relates to paper-making, and more particularly relates to techniques useful in encoding information in paper during its formation.

BACKGROUND AND SUMMARY OF THE INVENTION

Digital watermarking is a burgeoning science with an extensive literature. Some of it, by the present assignee, relates to texturing the surface of a paper to convey optically-detectable digital information.

The assignee's U.S. Pat. No. 5,850,481, for example, details how the micro topology of a paper can be shaped, e.g., by a Braille-like machine, to encode digital data. The assignee's application Ser. No. 09/127,502 details how the high-pressures used in intaglio printing can be used to similar effect.

In accordance with a preferred embodiment of the invention, paper is textured during the paper-making process, rather than in a subsequent process, thereby affording various advantages. The texture yields a known signature when transformed to the frequency domain. This signature can be used for various purposes, including determining the angular orientation of the paper when scanned and analyzed for the presence of watermark data, and for simple document recognition purposes (e.g., photocopiers that refuse to reproduce banknotes). One way of effecting the desired texturing is by shaping the surface of a de-watering element accordingly.

The foregoing and additional features of the present invention will be more readily apparent from the following detailed description, which proceeds with reference to the accompanying drawings.

DETAILED DESCRIPTION

Figure 1:
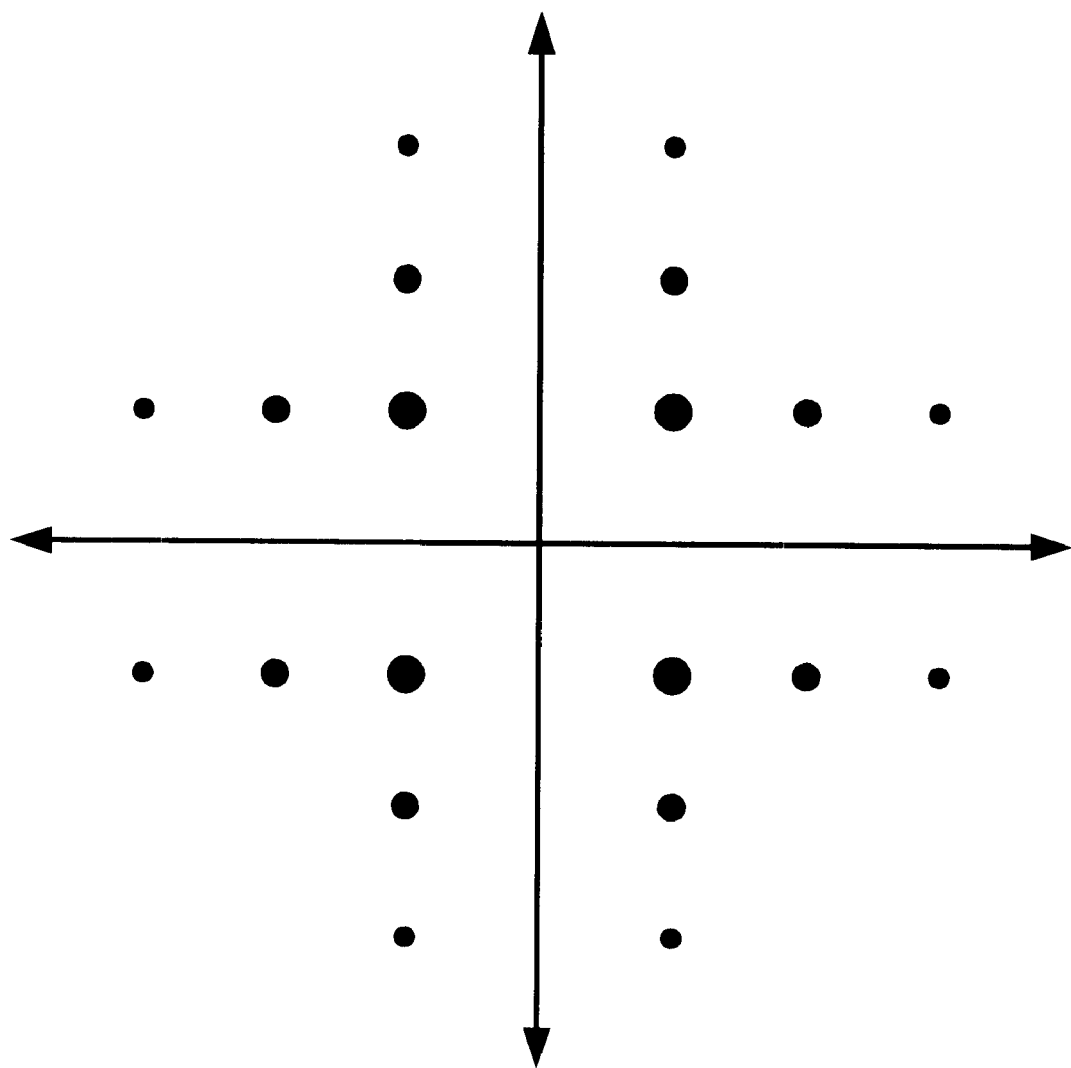
FIG. 1 shows the frequency spectrum attributed to surface texture of a banknote paper.

On optical scanning of an existing banknote, it was found that that the image data had components that were not attributable to the artwork printed on the note. Rather, further examination found that texturing left during the paper-making process had a pattern that appeared—when transformed into the frequency domain by a FFT process—as a well defined array of spectral impulses (FIG. 1). This spectrum of this particular note had the appearance of a 2-dimensional sampled sync function. (The size of the points in FIG. 1 signifies amplitude of the corresponding frequency component; each is an impulse.)

In the digital watermarking field, subliminal frequency domain patterns are sometimes deliberately inserted into images to serve as calibration signals by which scale, rotation, and offset can be computer-determined. (See, e.g., the assignee's U.S. Pat. No. 5,862,260.) Instead of adding such a pattern during printing, the patterns formed during paper-making might alternatively be used.

In accordance with one embodiment of the present invention, the printing on a paper is oriented so as to align in a predetermined manner with the texture markings on the paper surface. For example, the printing process can be tightly integrated with the paper-making process so that the orientation of the printing applied to the paper coincides in the desired manner with the paper texture. In a related embodiment, the paper-making and printing processes are not tightly integrated, but the paper is formed or cut so that its edges correspond in a known relationship to the texture pattern on the paper surface. By such arrangement, careful alignment of the paper's edge with a reference during later printing can assure that the image is oriented in the desired manner with the substrate texture. In still another embodiment, the paper is scanned just before printing, and the resulting data is processed so as to determine orientation of the texture signal. Printing is then oriented relative to the paper in the desired manner.

When a document printed by such a technique is thereafter placed on the platen of a scanner and scanned, the resulting image data is of uncertain rotation. The scan data can be converted to a frequency domain (e.g., by the FFT), and the known frequency pattern due to the paper texture can then be used as a calibration signal permitting the rotational state of the image data to be determined. Decoding of the watermark can then proceed once the rotation is known. (In some watermarking systems, scale and/or offset may also need to be determined. However, their determination is facilitated by knowledge of rotation. Moreover, the frequency domain signal may result in some ambiguity in the document orientation, e.g., rotations beyond 180 degrees may appear as rotations in the range 0–180 degrees. Such cases can be resolved through other means.)

As is familiar to those skilled in the art, paper is typically formed by depositing a layer of pulp slurry on a planar or cylindrical surface, extracting the water from the pulp, and drying. The middle step, sometimes known as de-watering, can be performed using various structures. Porous ceramic rollers are used in some processes, with a vacuum applied to the inside of the roller that serves to draw water away from the wet layer, through the pores, and to the inside of the roller. Other processes involve meshes or screens through which water is drawn from the pulp. The surfaces of such de-watering structures can be textured to impart a complementary texture (and a corresponding frequency-domain signal) to the paper.

In particular, a desired frequency domain signal can first be defined. The signal can be comprised of one or more impulses in the frequency domain, or can be spread across the spectrum. (The signal shown in FIG. 29A of U.S. Pat. No. 5,862,260 is exemplary of a suitable signal.) This signal is then inverse-transformed into the spatial domain, and the de-watering element then shaped in accordance with the resulting pattern.

In many embodiments, the frequency domain signal is manifested as a fine continuous "weave"-like pattern in the spatial domain. In other embodiments, pseudo-random patterns can be used. If desired, certain discrete markings in the spatial domain can also be provided on the de-watering element surface to provide additional functionality in the texture signal (e.g., permitting image translation to be determined in addition to image rotation).

In other embodiments, the frequency domain signal effected by the texturing does not serve as a calibration adjunct to another signal (e.g., a watermark signal). Rather, the frequency domain signal is employed alone. One application is in simple document recognition. For example, a photocopier may be arranged to look for the frequency domain signature characteristic of the texturing associated with banknote paper and, if detected on a document-to-be-copied, refuse to copy. (An example of another banknote sensing photocopier, albeit one that looks for a pattern in the printing on the document rather than in the paper texture, is shown in Canon's U.S. Pat. No. 5,583,614.) The texturing may be arbitrarily complex so as to reduce false triggering of such a detector.

In still other embodiments, the texturing can convey a plural-bit watermark payload. For example, the presence or absence of different frequency-domain components can signal "1" or "0" bits. Many other such arrangements will be apparent.

To provide a comprehensive disclosure without unduly lengthening this specification, applicant incorporates by reference the patents and applications cited above.

Having described an illustrated the principles of my invention with reference to specific embodiments, it will be recognized that the principles thereof can be implemented in many other, different, forms. For example, while the detailed embodiment discussed use of the FFT transform, the patterns formed during paper-making can likewise be discerned in other transform domains. Similarly, while a de-watering element was particularly noted as suitable for texturing, other elements in a paper-making apparatus can be alternatively be textured with similar effect. Still further, while the invention was illustrated with reference to conventional "paper," the principles thereof are equally applicable to other printable media, including plastic and the material marketed by DuPont under the brand name Tyvek. Yet further, while the illustrated embodiment textured the paper during its formation, post-formation texturing—as detailed in the assignee's other patents/applications—can be used in the particular applications above-detailed (e.g., to determine image rotation, for simple document recognition, etc.).

Moreover, the particular combinations of elements and features in the above-detailed embodiments are exemplary only; the interchanging and substitution of these teachings with other teachings in this and the incorporated-by-reference patents/applications are also contemplated.

I claim:

1. A method of determining a transformation of a paper document including:

optically scanning the paper document to generate scan data;

transforming the scan data to a frequency domain;

identifying frequency components in the transformed scan data corresponding to texture resulting from the paper's manufacture; and determining from said frequency components one or more possible transformations of the scanned documents from a reference state.

2. The method of claim 1 that includes determining from said frequency components a rotation of the scanned document from a reference orientation.

3. The method of claim 1 that includes determining from said frequency components a scale of the scanned document from a reference scale.

4. The method of claim 1 that includes determining from said frequency components a translation of the scanned document from a reference translation.

5. The method of claim 1 wherein the texture results from a de-watering element used in the paper's manufacture.

6. A method including:

optically scanning a paper document to generate scan data;

transforming the scan data to a frequency domain;

identifying frequency components in the transformed scan data corresponding to texture resulting from the paper's manufacture; and interpreting said identified frequency components to yield payload data including at least a registration indicator.

7. The method of claim 6 that includes determining from the registration indicator a rotation of the scanned document from a reference orientation.

8. The method of claim 6 that includes determining from the registration indicator a scale of the scanned document from a reference scale.

9. The method of claim 6 that includes determining from the registration indicator a translation of the scanned document from a reference translation.

10. The method of claim 6 wherein the texture results from a de-watering element used in the paper's manufacture.

11. A paper-making process including:

defining a frequency-domain signal, wherein the frequency-domain signal comprises an orientation component;

inverse transforming the frequency-domain signal to yield a two-dimensional pattern in the spatial domain;

shaping an element of the paper-making apparatus in accordance with said spatial domain pattern; and imparting said pattern to a paper surface, wherein the orientation component provides an orientation reference for paper made according to said paper-making process.

12. A printing process using paper made according to the method of claim 11, the printing process comprising: aligning printing on the paper so as to be oriented in a predetermined manner with respect to the pattern on the paper surface, wherein transforming optical scan data corresponding to said pattern into a frequency domain reveals an orientation of the paper.

* * * * *